United States Patent [19]

Huang et al.

[11] Patent Number: 4,627,060
[45] Date of Patent: Dec. 2, 1986

[54] WATCHDOG TIMER

[75] Inventors: Leon Huang, Hoffman Estates; John J. Selman, Vernon Hills, both of Ill.

[73] Assignee: Baxter Travenol Laboratories, Inc., Deerfield, Ill.

[21] Appl. No.: 676,130

[22] Filed: Nov. 29, 1984

[51] Int. Cl.[4] .............................................. G06F 11/00
[52] U.S. Cl. ...................................... 371/62; 364/200; 371/12
[58] Field of Search ........................ 371/12, 62, 14, 16; 364/200, 900

[56] References Cited

U.S. PATENT DOCUMENTS

| | | | |
|---|---|---|---|
| 4,227,798 | 10/1980 | Steiner | 371/20 X |
| 4,410,991 | 10/1983 | Lenart | 371/12 X |
| 4,429,366 | 1/1984 | Kennon | 371/12 X |
| 4,513,417 | 4/1985 | Lamb et al. | 371/12 |
| 4,551,841 | 11/1985 | Fujita et al. | 371/12 X |

Primary Examiner—Charles E. Atkinson
Attorney, Agent, or Firm—Paul C. Flattery; Daniel D. Ryan; Kay H. Pierce

[57] ABSTRACT

A self-checking timer usable with a host system includes a clock and a plurality of interconnected counters. During a power-up phase the timer generates a system reset signal and counts the counters in a predetermined sequence. A flip-flop is set and reset during the power-up phase and inhibits generation of the system reset signal. During a normal operating phase, the timer generates a test signal that must be responded to by the host system to continuously inhibit generation of the system reset signal.

7 Claims, 6 Drawing Figures

FIG. 1b VALID WINDOW GENERATOR

WATCHDOG TIMER

FIELD OF THE INVENTION

The invention pertains to hardware for continuously checking the operation of a host electronic system.

BACKGROUND OF THE INVENTION

As electronic systems have become more complex there has been an increasing need to verify, on an ongoing basis, that a given electronic system is in fact working properly. This testing function is often carried out by means of special diagnostic or testing hardware.

When an electronic system is first energized, and prior to the time when it starts functioning in a normal manner, it is desirable to be able to verify the operation of the testing circuitry. Experience indicates that this verification function must itself be carried out by the circuitry in question rather than by the host system. Once the testing circuitry has completed this verification sequence, it then can interact with the host system to verify the operation thereof.

In a second phase, it is also desirable to be able to continuously check the operation of the host system during its normal operation. In the event that the host system is a software controlled system, the ability to periodically respond to signals generated by the testing circuitry can readily be built into the software. In the event that the host system is a hard-wired unit, provision must be made in the hardware to generate the necessary response signals periodically.

In addition to the verification function carried out by the testing circuitry during the initial power-up phase, it is also desirable to allow the host system to itself check the status of the testing circuitry as part of an initial set of operations once the host system is permitted to start operating. This requires that the host system have the functional capability to test various conditions in the testing circuitry.

There is thus a need for hardware testing circuitry that can verify its own operation upon electrical power being applied thereto. This test circuitry should also have the functional ability to then permit the host system to begin operation. Finally, there is a continuing need for the testing circuitry to periodically generate test signals which can be sensed by the host system and responded to within a predetermined period of time. A failure of the host system within the predetermined period of time to respond to a test signal should cause the host system to halt operation.

SUMMARY OF THE INVENTION

In accordance with the invention, an apparatus is provided which executes a test sequence once electrical power has been turned on. The apparatus includes means for sensing initially applied electrical power and for generating a system reset signal in response thereto; checking means for generating a selected checking sequence of electrical signals and for setting an indicia in response thereto; and means for inhibiting the generation of said system reset signal in response to the presence of the set indicia.

The apparatus can additionally include means for generating a test signal; means for sensing a response to that test signal; and means for inhibiting generation of the system reset signal provided a selected response to the test signal has been sensed.

DETAILED DESCRIPTION OF THE PREFERRED EMBODIMENTS

Figure 1A:
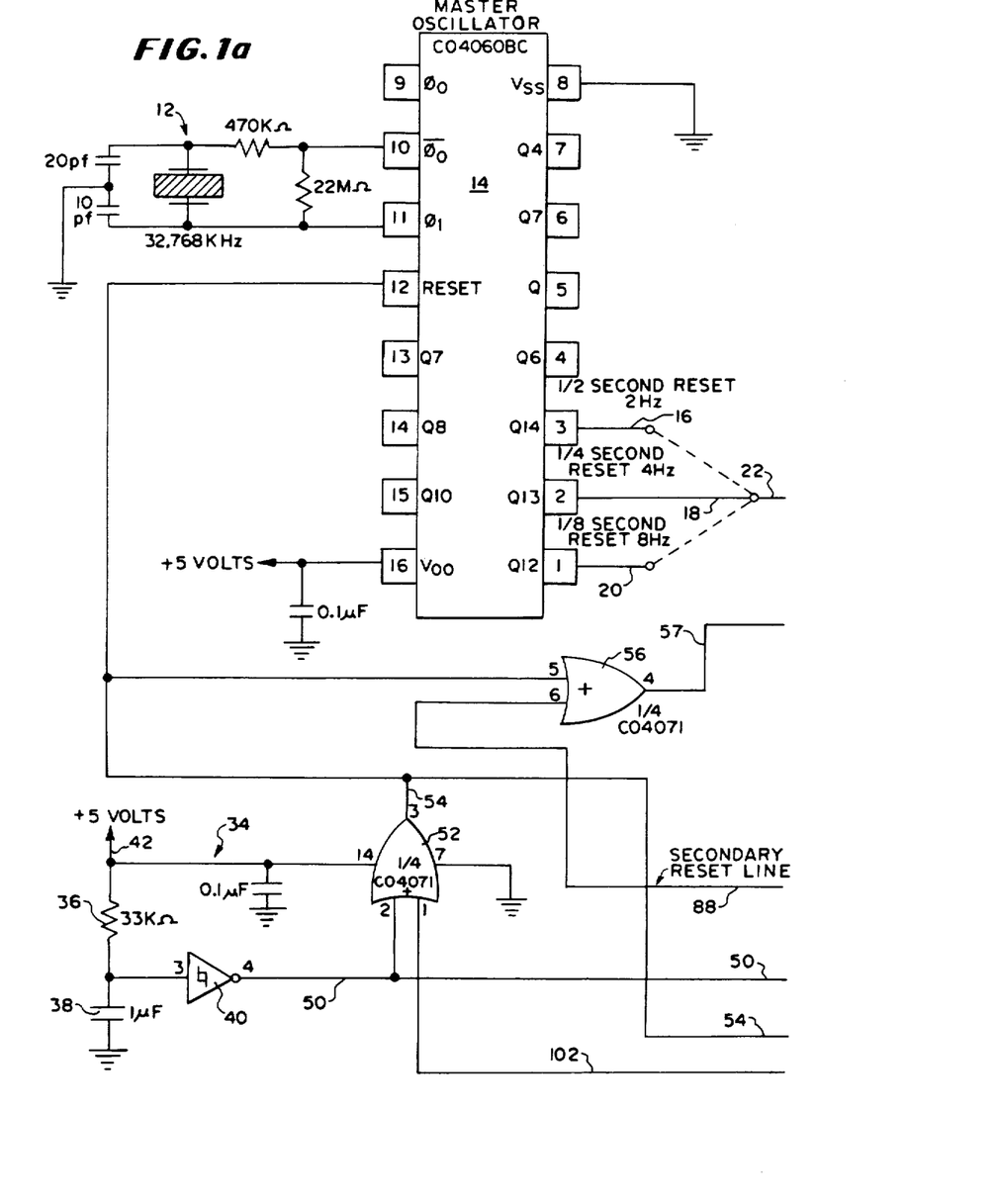
FIGS. 1A-1C combined are a schematic diagram of a watchdog timer in accordance with the present invention.
Figure 1B:
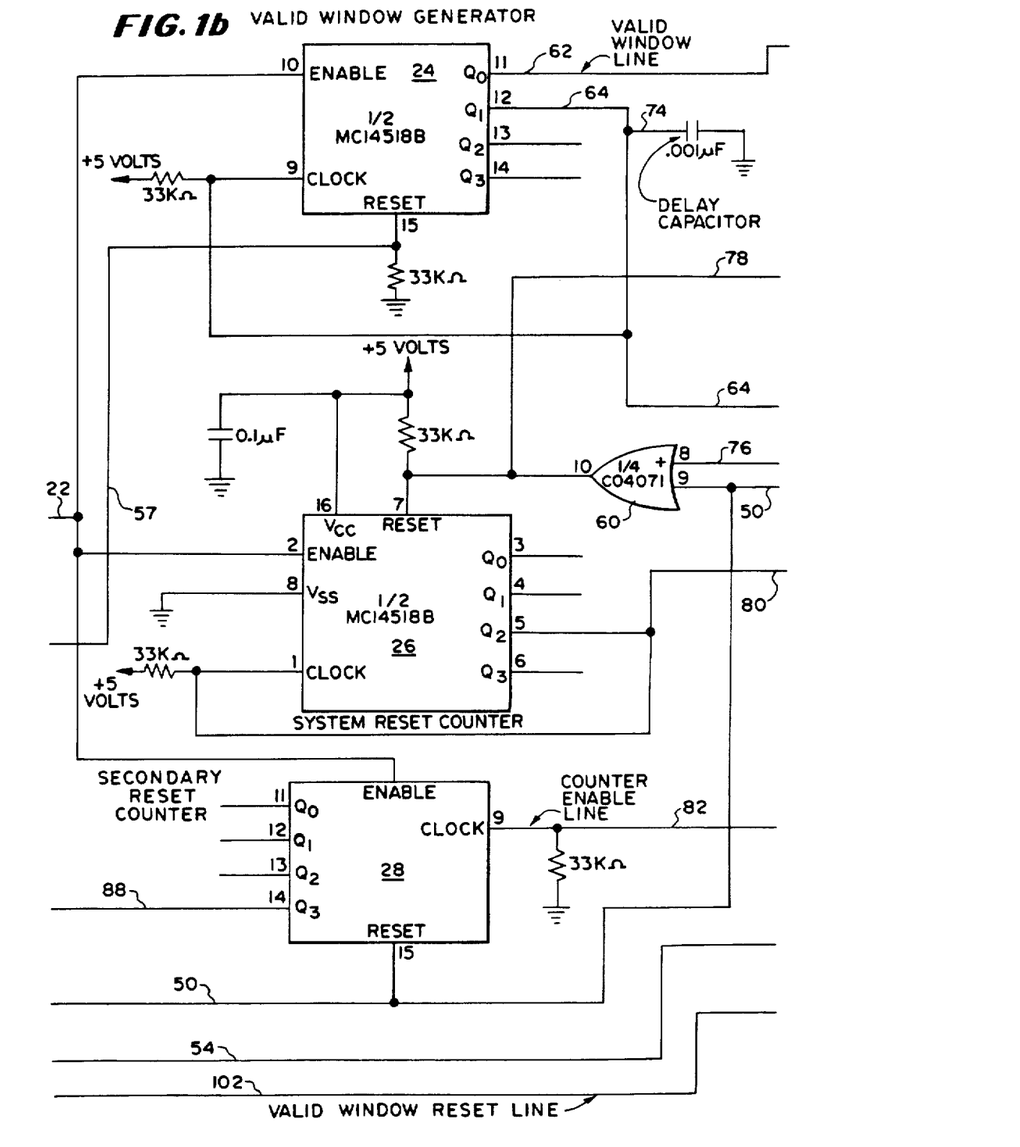
Figure 1C:
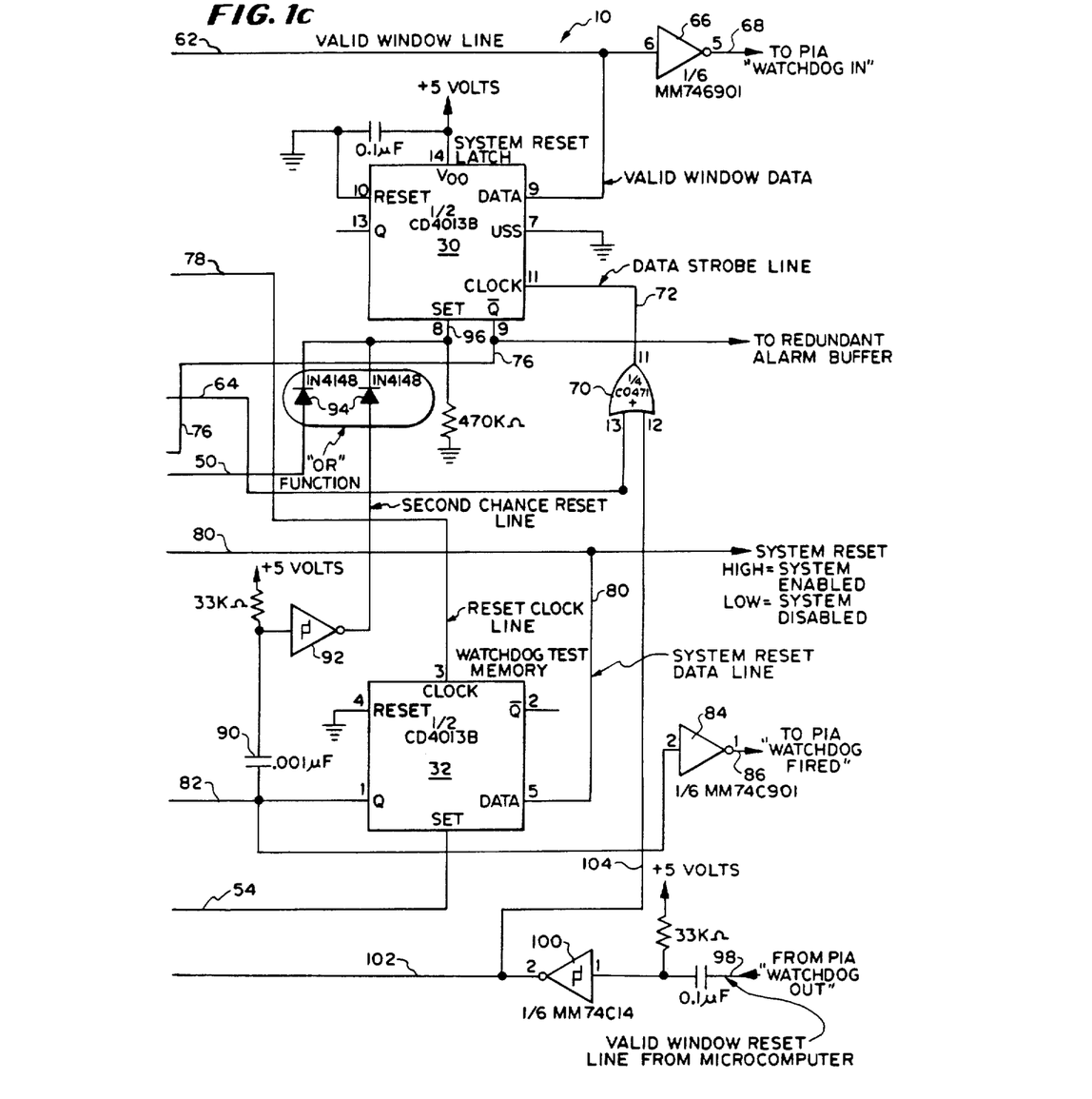

With respect to the figures, FIG. 1 is a schematic diagram of a watchdog timer 10 in accordance with the present invention. The watchdog timer 10 includes a crystal oscillator 12 with a divider counter 14 coupled thereto. The counter 14 provides clock pulses on a set of three lines 16, 18 or 20. The pulses on the lines 16, 18 or 20 provide a regular series of input pulses of a known frequency for the timer 10. The pulses on the line 16 have a two hertz frequency, on the line 18 a four hertz frequency and on the line 20 an eight hertz frequency. It has been found preferable to use the four hertz pulses of the line 18. The pulses on the line 18 are coupled by a clock line 22 to two synchronous decimal counters 24 and 26. It will be understood that the selected clock frequency of four hertz is not a limitation of the invention. The selected clock frequency is dependent on the characteristics of an associated host system.

The timer 10 operates in two phases. A first, or power-up phase, generates a set of test or checking signals only when the timer 10 is initially turned on. A second, or steady state phase, generates a repeating set of test signals until the timer 10 is turned off. The timer 10 is intended to be used with a host electronic system. The timer 10, in the power-up phase, generates a series of test signals that indicate the timer 10 is functioning properly. The host system is not permitted to start operating until the timer 10 correctly executes its power-up sequence. Once the host system is permitted to start operating by the timer 10 removing a system reset signal, the host can verify the status of the timer 10. During the steady state phase, the timer 10 continually generates a test signal to which the host system must properly respond. A failure of the host system to properly respond results in the timer 10 generating the system reset signal which will halt operation of the host system.

The decimal counter 24 functions as a valid window generator counter. In steady state operation, the host must respond to a valid window signal as discussed below. The decimal counter 26 functions as a system reset counter. The system reset counter 26 is only permitted to count during the initial, power-up, phase and is latched during the subsequent, steady state phase. The watchdog timer 10 also includes a third synchronous decimal counter 28, a secondary reset counter, whose operation is discussed subsequently.

The watchdog timer 10 includes a system reset latch 30, a flip-flop, and a watchdog test memory flip-flop 32. The additional gating interconnecting the circuitry or counters 24 through 32 will be discussed subsequently. FIG. 1 includes the type number of each of the above elements and also indicates the pin numbers to specify the connections between elements.

The watchdog timer 10 also includes a power-up reset circuit 34. The power-up reset circuit 34 includes a resistor 36 and a capacitor 38 which provide an input signal to a Schmitt trigger 40 when power is initially applied to a plus 5 volt line 42. On power-up, the Schmitt trigger 40 generates a single timer reset pulse on a line 50 for use within the watchdog timer 10. This positive going pulse is transmitted through an OR gate 52 and resets the master oscillator counter 14. This pulse is also transmitted via a line 54 through an OR gate 56, and resets the valid window generator counter 24. Additionally, the timer reset pulse on the line 54 sets the watchdog test memory flip-flop 32.

Figure 2A:
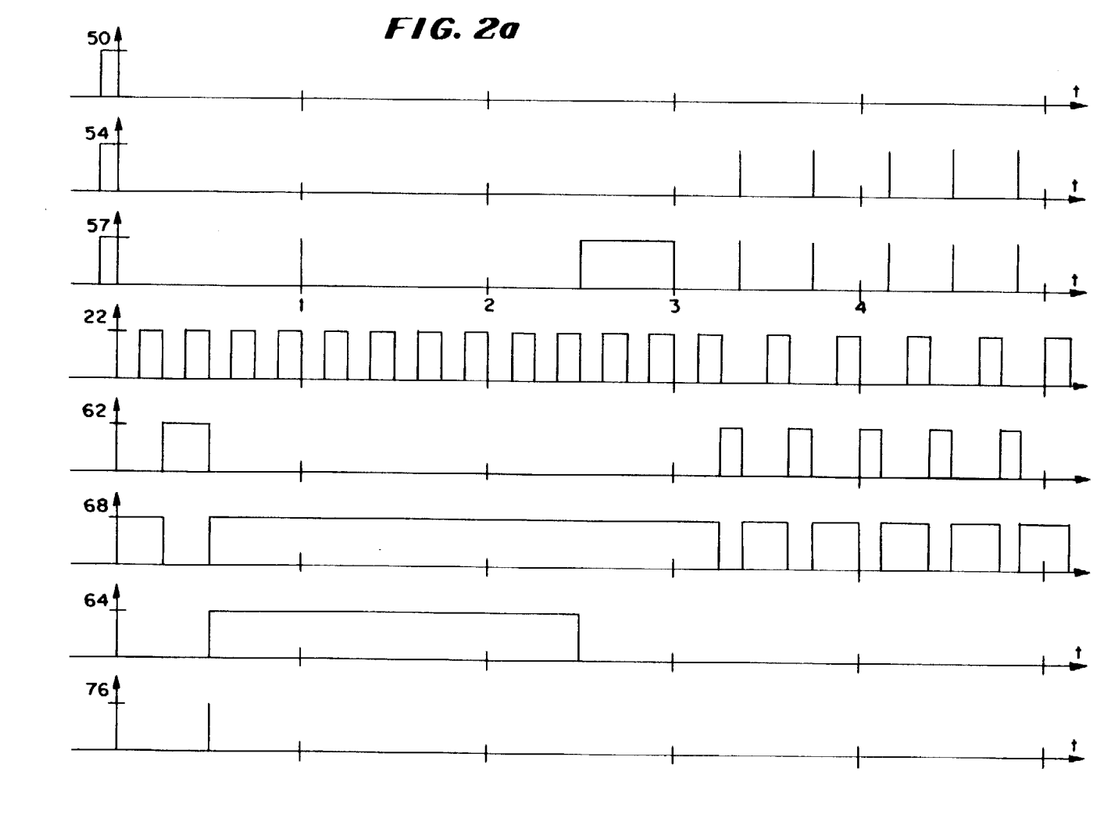
FIGS. 2A, 2B combined are a timing diagram illustrating selected electrical signals observable in the timer of FIG. 1.
Figure 2B:
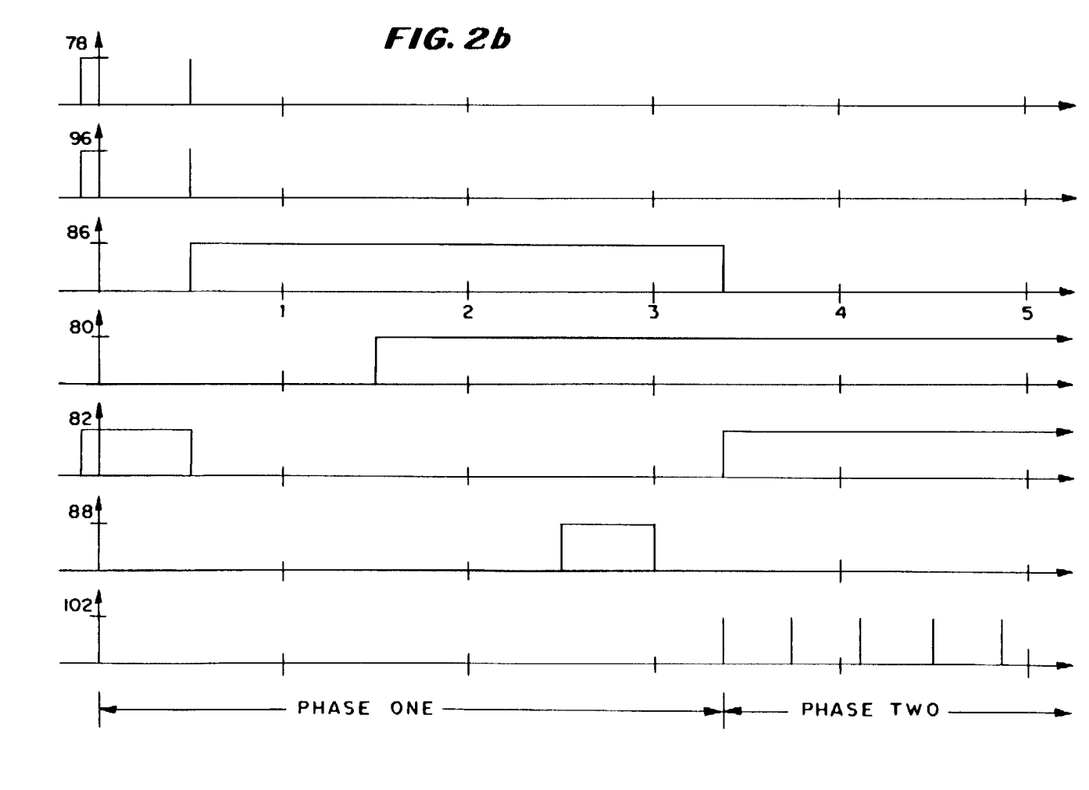

Via the reset line 50, the timer reset pulse resets the secondary reset counter 28, through an OR gate 60 resets the system reset decimal counter 26, and through a diode sets the system reset latch 30. The timer reset pulse on the line 50, with respect to the timing diagram on FIG. 2, is indicated on the topmost axis as having taken place prior to time equals zero. Once the timer reset pulse drops back to zero volts again, time starts counting for the watchdog timer 10 and begins to operate through the initial power-up phase. The timing diagram of FIG. 2 includes on its vertical axes identification numerals that specify electrical lines of the schematic of FIG. 1 where the corresponding electrical signal of FIG. 2 can be observed. The horizontal axes of FIG. 2 each indicate time in seconds starting at time equals zero where a vertical axis intersects each horizontal axis.

Commencing at time equals zero, oscillator 12 in combination with the master oscillator counter 14 generate a sequence of four hertz pulses on the line 22. Pulses on the line 22 in turn count the valid window generator counter 24. The signal on the line 22 is low at time equals zero. On each down count on the line 22, the valid window generator counter 24 is counted one count. Outputs of the two low order bits of the valid window generator counter 24 are illustrated on a pair of lines 62 and 64, as shown in FIG. 1, and with the wave forms on the corresponding axis shown in FIG. 2. On the first count sensed by the counter 24, on the line 22, the signal on the line 62 corresponding to the least significant bit of that counter goes high as indicated in FIG. 2. A high signal on the line 62 indicates a valid window interval during normal steady state operation. The signal on the line 62 can be inverted by an inverter 66 to provide a negated output on a line 68 for buffering purposes if desired.

On the second count generated by the pulse on the line 22, the signal on the line 62 goes down which in turn causes the signal on the line 64 to go up, as indicated in FIG. 2. The positive going signal on the line 64 freezes the valid window generator counter 24 at this count until subsequently reset. Additionally, the upgoing signal on the line 64 is coupled to an OR gate 70. The OR gate 70 provides a positive going signal to a clock input on a line 72 of the system reset latch 30. The pulse on the line 64 is delayed a short period of time by a capacitor 74. The purpose of the capacitor 74 is to insure that the rising edge of the pulse on the line 64 arrives at the clock input to the counter 30, through the OR gate 70, after the signal on the line 62 has fallen.

The line 62 functions as the data input line to the system reset latch 30. A low signal on the line 62 in combination with a positive going clock pulse through the OR gate 70 on the clock line 72, clocks a low input from the line 62 into the system reset latch 30. This low signal then produces a high output on a line 76, the negated output, of the reset latch 30. A positive going signal on the line 76 is coupled through the OR gate 60 to the reset input of the system reset counter 26 resetting that counter once again.

Additionally, the OR gate 60 is coupled to a clock input of the watchdog test memory latch 32 by a line 78. The above noted positive going signal from the system reset latch 30 clocks the watchdog test memory flip-flop 32. A low signal is present on a line 80 connecting an output of the, now reset, system reset counter 26 to a data input for the watchdog test memory flip-flop 32. As a result, the watchdog test memory latch 32 is loaded with the logical zero on the line 80 by the clock pulse on the line 78. Previously the watchdog test memory flip-flop 32 had been set placing a high on an asserted output line 82 thereof. The line 82 now goes low as can be seen from FIG. 2.

The line 82 is also coupled to an inverter 84 which generates a high signal on an output line 86. This high signal indicates that the watchdog test memory flip-flop 32 has had a low clocked into its data input from the system reset data line 80. The signal on the line 86 can be subsequently interrogated by the host system software and/or hardware to test whether or not the flip-flop 32 has entered its proper state. The host system thus has a capability of verifying that the timer 10 has properly executed its internal test sequence.

Additionally, the line 82 is coupled to a clock input of the secondary reset counter 28. As a result of the low going signal on the line 82, the secondary reset counter 28 may now be counted by clock pulses on the line 22. Output from the secondary reset counter on a line 88 will subsequently go high for later use. The line 82 is coupled through a capacitor 90 and a Schmitt trigger 92 to an input of the OR gate 94. A positive going pulse from the Schmitt trigger 92 is transmitted through the OR gate 94 to set the system reset latch 30. Immediately in response to the positive going output from the OR gate 94 on a line 96, the system reset latch 30 will set causing a low to appear on the line 76. As can be seen from FIG. 2, the signal on the line 76 is a very narrow spike-like pulse indicating that the system reset latch has been set by the signal on the line 96.

The down-going signal on the line 76 is transmitted through the OR gate 60 to the system reset counter 26. Due to a low input on the line 78, counter 26 is now permitted to count in response to the clock signals on the line 22. Subsequently, after four counts have been received on the line 22, the third stage output of the counter 26, connected to the line 80 goes high as indicated in FIG. 2. The high signal on the line 80 immediately latches the system reset counter 26 in this state.

The line 80 is the host system reset line. The high signal on the line 80 now can be used to enable the operation of the host electronic system. When low, as has been the case up to this point, the signal on the line 80 inhibits operation of the host system.

Additionally, it should be noted that once the host system is able to begin functioning, because of a high signal on the line 80, it can immediately test or poll the line 86 to determine whether or not that signal is high. The presence of the high value on the line 86 indicates that the watchdog test memory flip-flop 32, line 82, has been set and clocked low. Subsequent to having polled the line 86, the host system will expect to see, at a later time, a sequence of valid window signals on the line 68. These test signals must then be responded to on a regular basis. However, the timer 10 has not as yet entered its second phase of steady state operation.

With respect to completing the power-up phase, the secondary reset counter 28 is counted up and generates a high signal on the line 88, as can be seen from FIG. 2. The high signal on the line 88 is transmitted through the OR gate 56 and resets the valid window generator 24. The relatively high voltage continually applied through the OR gate 56 to the valid window generator 24 freezes the counter 24 in the reset state for the duration of that reset signal. After the secondary reset counter 28 receives two more counts on the line 22, the signal on the line 88 drops to a relatively low value. The valid window generator 24 is then able to begin counting in response to the pulses on the line 22. After the valid window generator 24 receives the first count on the line 22, its output on the line 62 goes high as can be seen in FIG. 2.

Upon the host system circuitry sensing a low signal on the line 68, a negative going response pulse must be applied by the host on a valid window reset line 98. The negative going signal on the line 98 in turn causes a Schmitt trigger 100 to generate a positive going pulse on a valid window reset line 102. The positive going pulse on the line 102 is coupled through the OR gate 52 and the line 54 to again set the watchdog test memory flip-flop 32. A high signal is also applied on the line 82 as can be seen from FIG. 2. The high signal on the line 82 in turn latches the secondary reset counter 28 and blocks further counting in response to pulses on the line 22. This operation concludes phase one of the watchdog timer 10.

Subsequently, the host system can again poll the line 86 to sense whether or not a low is present indicating that the watchdog test memory flip-flop 32 has in fact been set a second time.

During phase two or steady state operation, the valid window generator counter 24 regularly receives pulses on the line 22. In response, the counter 24 applies a relatively high voltage to the valid window line 62. During the time that the valid window line 62 is high, the host system must respond with a low signal on the line 98. By responding with a low signal on the line 98, the signal on the reset line 80 will continue to stay high. So long as the signal on the reset line 80 continues to stay high, the host system will be enabled and continue to operate. If the host system responds prematurely, before the signal on the line 62 goes high, the signal on the line 80 will drop to a low value disabling the host system. If the host system responds too late, after the signal on the line 62 goes low, or fails to respond at all, the signal on the line 80 will drop to a low value disabling the host system.

In the event that the host system does not apply a low going signal on the line 98 prior to the signal on the line 62, the valid window line, going low as previously discussed, the system reset latch 30 will be clocked low. A high signal will then be applied to the line 76. The signal on line 76 will be coupled through the OR gate 60 and will reset the system reset counter 26. As a result, a low signal will be applied to the line 80 disabling the host system.

In the event that the host system applies a low going signal on the line 98 prior to the signal on the valid window line 62 going high, the positive going pulse generated by the Schmitt trigger 100 will be coupled through a line 104, through the OR gate 70 and into the clock input of the system reset latch 30. The latch 30 will then transfer a low signal from the valid window line 62, via its data input to its asserted output. Correspondingly the negated input on the line 76 goes high. As previously discussed, the system reset signal on the line 80 will go low inhibiting the operation of the host software or hardware.

In the preferred embodiment of FIG. 1, a four hertz clock has been selected, as indicated on line 18. The valid window line 62 thus goes high every 250 milliseconds. The host system must respond on the line 98 within the next 250 milliseconds before the next pulse appears on the line 22. By so responding, the system reset line 80 will continue to stay high and not go low. Operation of the host will thus continue normally. The watchdog timer 10 continues to operate in phase two until disabled by removing power.

Figure 3:
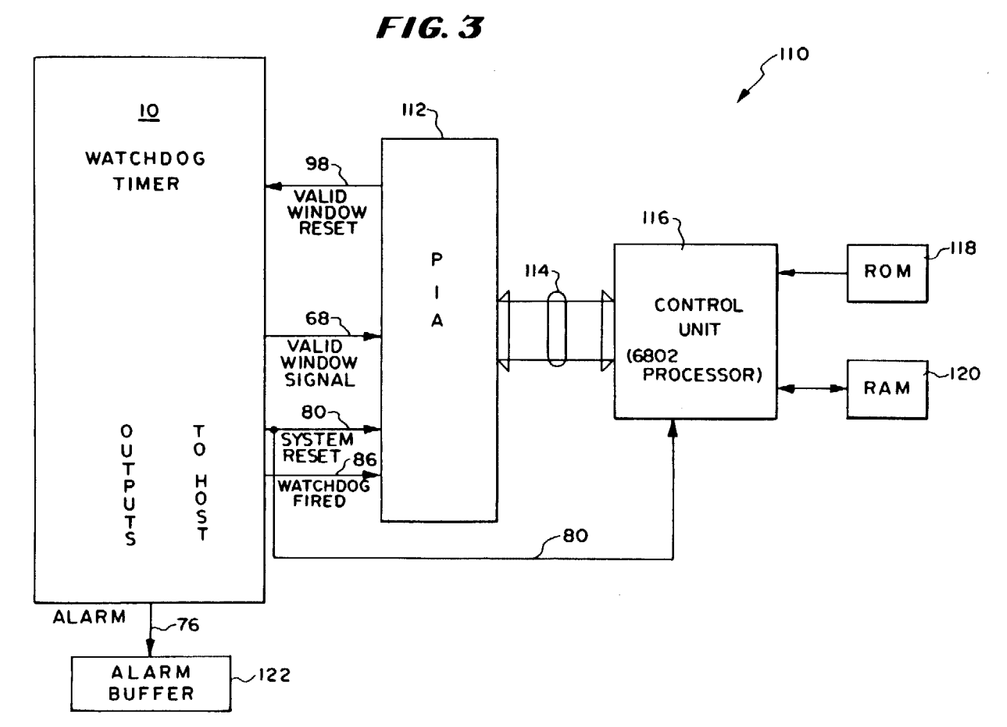
FIG. 3 is a schematic block diagram illustrating the timer of FIG. 1 incorporated into a host control system.

FIG. 3 illustrates the watchdog timer 10 combined with a host system 110. The host system 110 includes one or more peripheral interface adapters (PIA) 112 of a conventional variety which are coupled by a standard bidirectional data bus 114 to a control unit 116. The control unit 116 can for example be a Motorola type 6802 microprocessor. Associated with the control unit 116 is a bank of read only memory (ROM) 118 and a bank of random access memory (RAM) 120.

A control program can be loaded into the ROM memory 118 for subsequent execution by the control unit 116. The PIA 112 is coupled to the watchdog timer 10 by the valid window reset line 98. On the line 98 the PIA 112 generates the negative going pulse discussed previously for the purpose of responding to the valid window signal periodically generated on the line 68 by the watchdog timer 10. Outputs from the watchdog timer 10 which include the valid window signal 68, the alarm signal 76, the system reset line 80 and the watchdog fired line 86. Outputs from the timer 10 such as the line 68, 80 and 86 are coupled to one or more peripheral interface adapters such as the PIA 112 which in turn provides inputs through the data bus 114 to the control unit 116.

The host system 110 can include as part of the control program in the ROM 118 an instruction or instructions to cause the PIA 112 to generate the valid window reset signal on the line 98 in response to the presence of the valid window signal on the line 68. Further, the control program 118 can include an instruction or instructions to sense whether or not the signal on the line 86 indicates that the watchdog has fired, as previously discussed.

The alarm output signal on the line 76 can go directly to an alarm buffer 122. The buffer 122 can provide signals to generate alarm indicia. The system reset line 80 can also be electrically connected directly to the control unit 116.

While a programmable control unit 116 is illustrated in FIG. 3, it will be understood that the host system need not be a programmable system but in fact could be a hardwired system if desired. Whether or not the host system is programmable or hard-wired is not a limitation of the present invention. Further, the exact details as to how the control program in the ROM 118 communicates with the watchdog timer 10 are not a limitation of the present invention, so long as the control program generates the valid window reset signals on the line 98 in response to having sensed the valid window signal on the line 68. As noted above, a failure to timely respond with a valid window reset signal on the line 98 will cause the system reset line 80 to become activated by the watchdog timer 10 thereby disabling operation of the host system 110.

Modifications and variations of the present invention are possible in light of the above teachings. The broader aspects of the invention include the use of alternate types of counter circuits other than those disclosed herein as well as the use of alternate gating circuits. The broader aspects of the invention also include the use of the watchdog timer disclosed herein in connection with hard-wired control systems. It is therefore to be understood that within the scope of the appended claims the invention may be practiced, otherwise than as specifically described.

What is claimed and desired to be secured by Letters Patent of the United States is:

1. An apparatus for generating a controlled system reset signal comprising:
    first means for sensing an initial application of electrical power and for generating said reset signal;
    second means for generating a plurality of clock pulses of a selected frequency;
    third means for selectively counting said clock pulses in a selected, predetermined counting sequence; and
    fourth means for sensing said predetermined counting sequence including means for setting a selected indicia in response thereto and for inhibiting generation of said reset signal in response thereto.

2. An apparatus as defined in claim 1 further comprising:
    fifth means for repetitively generating a test signal when said reset signal is inhibited; and
    sixth means for sensing a selected response to said test signal and for blocking generation of the system reset signal provided a selected response to the test signal has been sensed.

3. A timing apparatus for monitoring the start-up and operating functions of a host system comprising:
    first means for generating a series of test signals when power is initially supplied to said timing apparatus and for determining if said timing apparatus is functioning properly;
    second means for removing a host system reset signal to allow said host system to begin operating after said first means has determined that said timing apparatus is functioning properly;
    third means for generating a test signal for transmission to said host system during operation of the host system and to which said host system must properly respond to continue operation of said host system; and
    means for generating said system reset signal to halt operation of said host system when said host system does not properly respond to said test signal generated by said third means.

4. An apparatus as recited in claim 3, wherein said third means further comprises:
    a valid window generator (24) for continuously generating valid window signals for transmission to said host system and to which said host system must properly respond to continue operation of said host system.

5. An apparatus as recited in claim 4, wherein said first means further comprises:
    a first counter (14) for generating uniformly pulsed signals;
    a secondary reset counter (28) for receiving and counting said signals from said first ocunter (14) and for generating a signal when said secondary reset counter (28) has counted a preset number of signals from said first counter;
    fourth means for transmitting signals from said first counter to said valid window generator (24) to enable said valid window generator (24) in response to said signal from said secondary reset counter (28);
    fifth means for transmitting signals from said first counter (14) to said valid window generator (24) after said valid window generator (24) has been enabled to generate said valid window signals;
    sixth means for receiving a valid window generator reset signal from said host in response to said valid window signals; and
    seventh means for transmitting said valid window generator reset signal to said valid window generator (24) to reset said valid window generator.

6. An apparatus as recited in claim 5 wherein said seventh means further comprises:
    eighth means for blocking signals from said first counter (14) to said valid window generator (24) in response to said valid window generator reset signal.

7. An apparatus as recited in claim 3 wherein said third means further comprises:
    a first counter (14) for generating uniformly pulsed signals; and
    a valid window generator (24) for receiving said signals from said counter (14) and for generating said test signal.

* * * * *